United States Patent
Vcelka et al.

(10) Patent No.: US 11,493,027 B2
(45) Date of Patent: Nov. 8, 2022

(54) WIND TURBINE NACELLE COOLING

(71) Applicant: Vestas Wind Systems A/S, Aarhus N. (DK)

(72) Inventors: Martin Patrick Vcelka, Gjern (DK); Matthieu Alexandre, Brabrand (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 16/954,365

(22) PCT Filed: Dec. 14, 2018

(86) PCT No.: PCT/DK2018/050366
§ 371 (c)(1),
(2) Date: Jun. 16, 2020

(87) PCT Pub. No.: WO2019/114909
PCT Pub. Date: Jun. 20, 2019

(65) Prior Publication Data
US 2021/0079898 A1    Mar. 18, 2021

(30) Foreign Application Priority Data

Dec. 17, 2017  (DK) .......................... PA 2017 70952

(51) Int. Cl.
*F03D 80/60*    (2016.01)
*F03D 80/80*    (2016.01)
*F03D 9/25*     (2016.01)

(52) U.S. Cl.
CPC ............. *F03D 80/60* (2016.05); *F03D 80/88* (2016.05); *F03D 9/25* (2016.05); *F05B 2240/14* (2013.01); *F05B 2260/20* (2013.01)

(58) Field of Classification Search
CPC ...... F03D 80/60; F03D 80/88; F05B 2240/14; F05B 2260/20
See application file for complete search history.

(56) References Cited

U.S. PATENT DOCUMENTS

| 7,427,814 | B2 * | 9/2008 | Bagepalli | ................. H02K 9/02 |
| | | | | 290/55 |
| 7,789,623 | B2 * | 9/2010 | Teipen | .................... F03D 80/80 |
| | | | | 415/232 |

(Continued)

FOREIGN PATENT DOCUMENTS

| EP | 2255088 A1 | 12/2010 |
| EP | 3477101 A1 | 5/2019 |
| WO | 2010089006 A2 | 8/2010 |

OTHER PUBLICATIONS

Danish Patent and Trademark Office, Search and Examination Report in PA 2017 70952, dated May 3, 2018.

(Continued)

*Primary Examiner* — Richard A Edgar
*Assistant Examiner* — Jason G Davis
(74) *Attorney, Agent, or Firm* — Wood Herron & Evans LLP

(57) ABSTRACT

A wind turbine has a nacelle which houses operative components such as a transformer or converter which in use generate unwanted heat, the nacelle including an external nacelle cover (20) to form the outer nacelle enclosure, and provided with a panel (24) which overlies a bottom cover (22) region forming therewith a conduit for directing external air to one or more of the heat generating operative components for cooling purposes.

19 Claims, 5 Drawing Sheets

(56) References Cited

U.S. PATENT DOCUMENTS

| | | | |
|---|---|---|---|
| 8,698,342 B2* | 4/2014 | Hirai | F03D 80/60 |
| | | | 290/55 |
| 2010/0061853 A1 | 3/2010 | Bagepalli | |
| 2010/0127502 A1 | 5/2010 | Uchino et al. | |
| 2012/0025541 A1 | 2/2012 | Hirai et al. | |
| 2012/0032449 A1 | 2/2012 | Wobben | |
| 2013/0011272 A1* | 1/2013 | Mortensen | F03D 80/82 |
| | | | 416/244 R |
| 2015/0300323 A1* | 10/2015 | Neumann | F03D 80/00 |
| | | | 415/168.1 |

OTHER PUBLICATIONS

European Patent Office, International Search Report and Written Opinion in PCT Application No. PCT/DK2018/050366, dated Mar. 19, 2019.
European Patent Office, Examination Report in EP Application No. 18829721.2, dated Jul. 18, 2022.

* cited by examiner

WIND TURBINE NACELLE COOLING

The present invention relates to a wind turbine nacelle which is adapted to provide cooling air for cooling heat-generating components, and to a method of nacelle cooling.

Wind turbines include various operative components which generate significant amounts of unwanted waste heat. These include major mechanical components such as components of the drive train where the origin of the heat is internal frictional forces, and electrical systems where heat is generated within individual electronic and electrical components themselves. Examples of such major electrical systems include the electrical power converters and the transformers.

It is conventional that various heat-generating operative components are cooled by air. Cool external air is drawn into the nacelle through openings in the nacelle and directed via conduits or ducts over or into the components where heat is exchanged with the air. The warmed air is then directed out of the nacelle via exit conduits or ducts and expelled through air outlets.

With advancing technological developments, wind turbines of ever greater power rating are provided. With increased power delivery, the heat production of components also increases. Moreover, there is a drive to pack higher-rated components into the same or minimally-increased space, in order to avoid making the overall size of the turbine greater, with associated problems of transport, installation and material cost. The result is that it becomes an ever greater challenge to fit the various components within the nacelle, especially in a manner to allow access for service or replacement. Arranging conduits for cooling air in an increasingly densely packed nacelle becomes increasingly challenging.

The present invention seeks to provide a nacelle structure which addresses these challenges.

SUMMARY OF THE INVENTION

According to a first aspect of the invention there is provided a wind turbine comprising a nacelle which houses operative components which in use generate heat, the nacelle including an external nacelle cover to form an enclosure, and provided with a panel which overlies a region of the external cover to define therewith a conduit for directing external air to one or more of the heat generating operative components, wherein a duct or ducts are connected between the internal panel and one or more heat generating operative components to direct the cooling air thereto from the conduit.

Such air cooling may be relevant for a variety of operative components such as the converter, and transformer. It may also be used in connection with the gearbox and generator.

In the preferred embodiment the panel is an internal panel which overlies a bottom cover of the external nacelle cover. The panel may extend laterally across substantially the entire width of the bottom cover part. The external cover includes an air inlet which opens into the conduit, preferably at a forward region of the bottom cover to the front of the tower opening. The conduit extends from this forward region, around sides of the tower opening at which the nacelle is connected to the tower, towards the rear of the nacelle. Connection to the conduit may be made at various points along the conduit to respective components via the ducts in order to receive cooling air. For this purpose, short ducts or tubing may be connected between the internal panel and one or more heat generating operative components, for example to the air inlet manifold thereof, to direct the cooling air thereto from the conduit. Fans are provided at various positions in the conduit or at connections with the conduit to the components, to draw air into and along the conduit and direct it to the various operative components to be cooled.

For the purposes of this description the "forward" direction is taken to be the direction in the nacelle towards the rotor and the "rearward" the opposite direction which is away from the rotor.

The internal panel may be formed on an underside which faces the external cover with partitions which serve to direct the flow of cooling air in a defined path or paths and to specific points at which connection is made to particular components to be cooled.

The internal panel may be configured to have a modular form whereby a single panel may be manufactured for use with a variety of nacelle layouts, and then the panel adapted for use with a particular nacelle layout. To this end it may be formed with a plurality of partitions extending laterally and longitudinally, which partitions are selectively removable prior to assembly in order to define a desired flow path for a particular configuration of nacelle and its heat generating operative components.

In one embodiment the air directing function may be combined with a liquid spillage collecting function. The internal panel is formed with an upstanding rim near its periphery to upwardly define a liquid collecting receptacle to collect liquid leakage or spillage from liquid containing components. A number of receptacles may be defined by upstanding rims associated with individual components. These may be separate from each other or may be interconnected to allow fluid to flow between receptacles. The internal cover part may further define a channel region at its lateral periphery to collect any liquid passing down the side walls of the nacelle cover, for example as condensation.

As an alternative to arranging a conduit over the bottom cover of the nacelle, this may instead or in addition be provided at the nacelle sidewalls. Internal panels may be provided which laterally overlie the sidewalls. The inlets for the conduit are again preferably near a forward end of the nacelle extending rearwardly along the nacelle.

In a further aspect the invention provides a method of cooling heat generating operative components in a wind turbine having the construction as defined above, the method comprising drawing air into the conduit from the exterior and directing it via the conduit and the ducts to the heat generating operative components. In a preferred method cooling air is taken in through an inlet at or near a forward end of the nacelle into the conduit, and expelled from the nacelle after passing through or over one or more heat-generating components.

BRIEF DESCRIPTION OF THE DRAWINGS

The invention will now be further described by way of example only and with reference to the accompanying figures in which.

DETAILED DESCRIPTION

Figure 1:
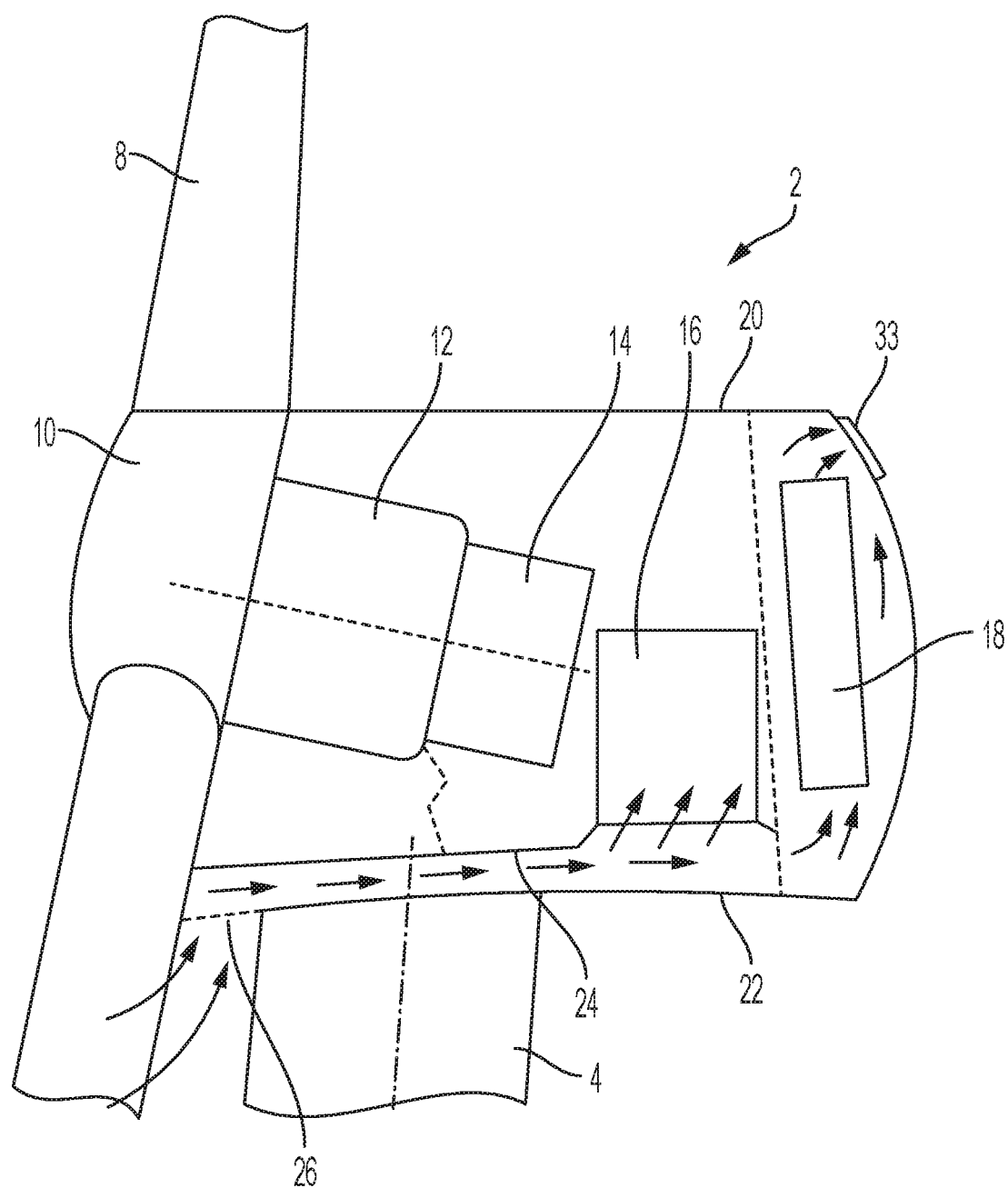
FIG. 1 is a schematic side view of a wind turbine with nacelle incorporating a cooling structure according to an embodiment of the invention.

As shown in FIG. 1 a wind turbine nacelle structure is shown which incorporates a cooling arrangement according to an embodiment of the present invention.

As is conventional, the wind turbine includes a nacelle 2 which houses the main operative components of the turbine as further discussed below. The nacelle sits atop a tower 4 which extends from a ground mounted foundation (not shown). A rotor 6 comprises a number of blades 8 (typically three blades) which are mounted on a central hub 10. The hub 10 is connected at a forward end of main shaft which is supported on a main bearing. The main bearing housing is shown schematically by 12 in the figure. The main shaft extends into gearbox and generator collectively indicated 14, which may comprise separate components or as a combined structure. The gearbox serves to increase the rotational speed to an appropriate degree for turning generator, whilst the generator serves to convert the rotational energy into electrical energy, as is well known in the art. Arranged to the rear of the generator and laterally displaced relative to the nacelle centreline towards a sidewall of the nacelle, is the power converter contained within converter cabinets indicated 16. Electrical transformer 18 is arranged at the nacelle rear in a dedicated transformer enclosure. The transformer 18 increases the voltage of the generated electricity from about 690V to a medium voltage for connection to the grid via one or more further step up transformers. The operative components are supported on an internal load-bearing machine frame (not shown) which is connected to the tower by means of a yaw bearing (not shown). The position of the tower opening in the nacelle at which connection is made via the yaw bearing is indicated 19 in FIG. 4. The nacelle is provided with an external nacelle cover 20 which encloses the operative components shielding them from the environment. In one form this is generally box-like with bottom cover, roof, opposed side walls, and front and rear ends, these being formed by a number of interconnected panels of a light rigid material such as a composite material, glass-fibre reinforced plastic or the like which are carried directly or indirectly on the machine frame. In other forms the nacelle cover may be generally cylindrical or other shape.

The main operative components mentioned above all produce a degree of unwanted waste heat when in operation, the mechanical components such as the gearbox due to frictional forces, the generator as an electro-mechanical converter due to both mechanical friction and electrical losses, and the transformer due to electrical losses.

As is conventional, certain of these components are cooled by means of cooling liquid which is circulated in a closed cooling circuit which passes through a heat exchanger (not illustrated). For example, the gearbox is cooled by means of an oil or water flow circuit in thermal communication with a heat exchanger which may be externally mounted on the nacelle, such as on the nacelle roof whereby heat can be exchanged with the external environment.

Figure 2:
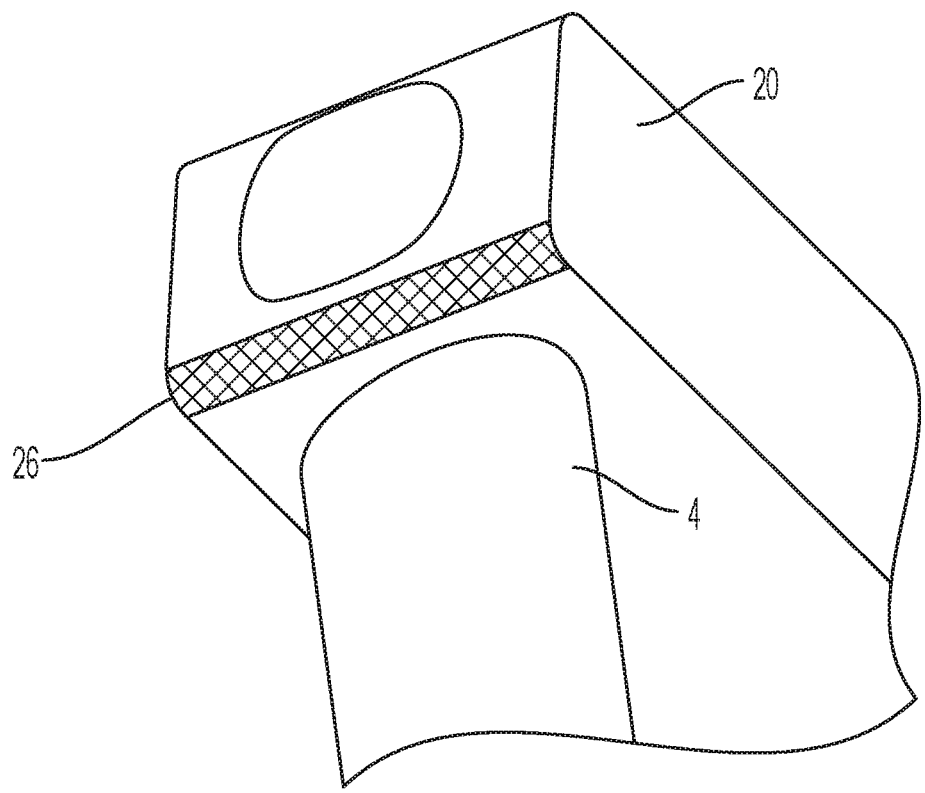
FIG. 2 shows a front region of the nacelle (without rotor) to show the air inlet position.
Figure 3:
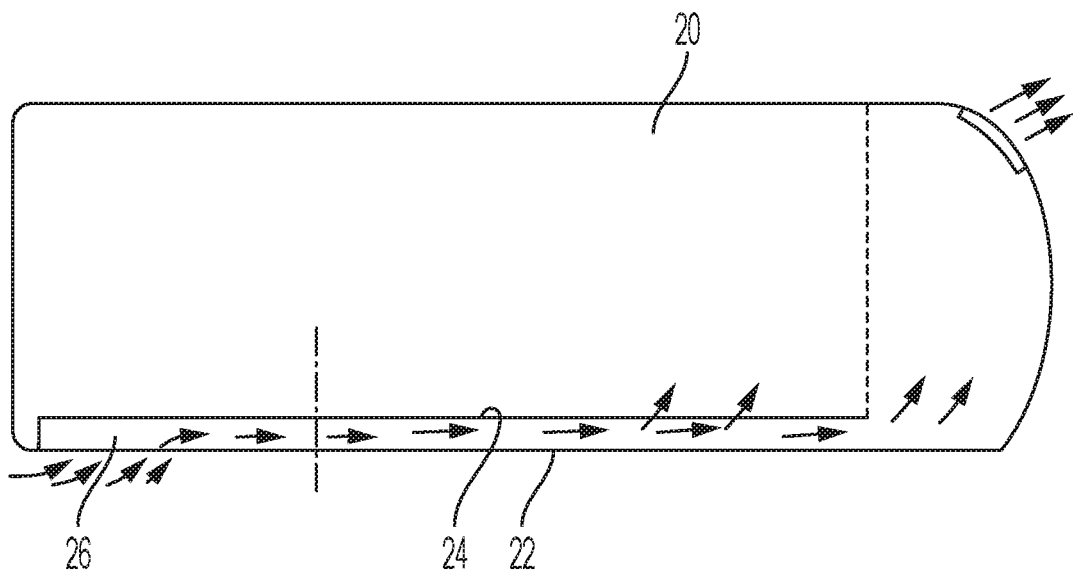
FIG. 3 shows the nacelle with air conduit, showing the flow of cooling air.
Figure 4:
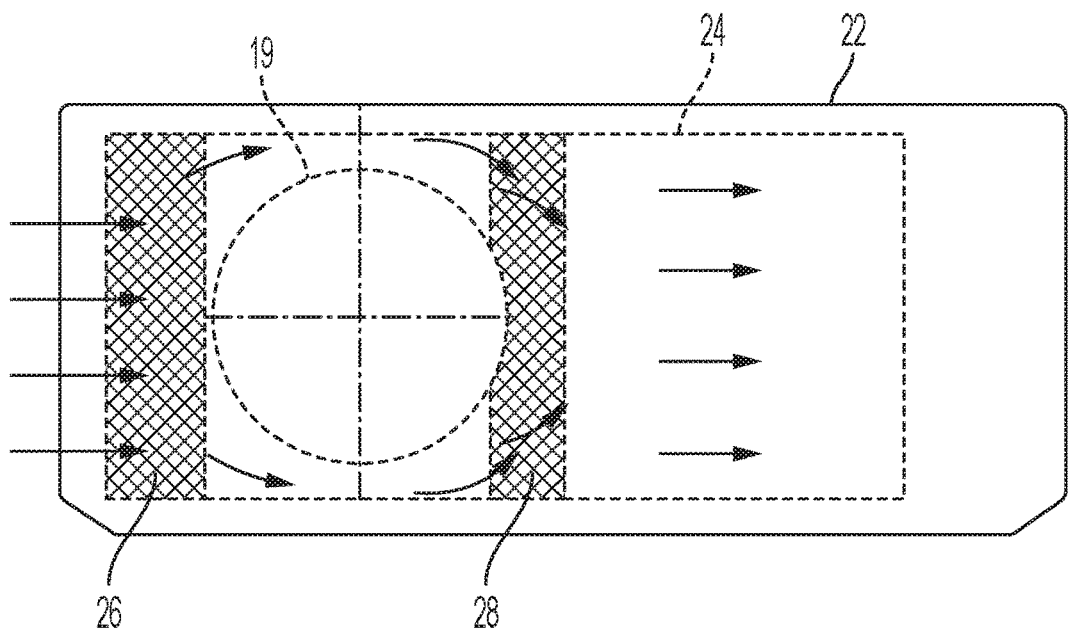
FIG. 4 is a plan view of the nacelle from below showing the position of the conduit arrangement.
Figure 5A:
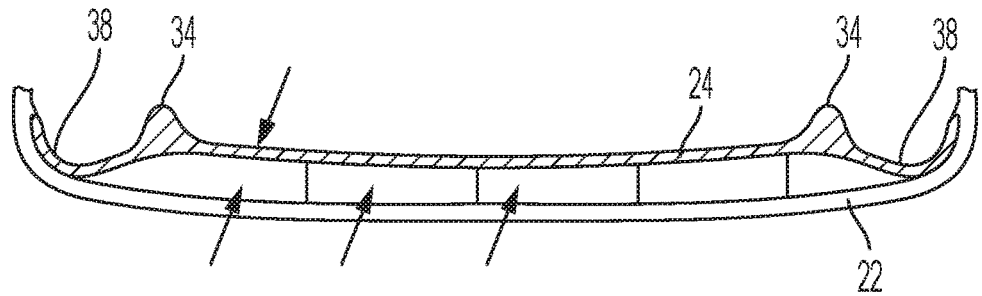
FIG. 5A is a sectional view across a lower region of the nacelle to show the bottom cover and internal panel.

Various heat-generating components are required to be air-cooled and are conventionally cooled by external air which is led over or through the component from dedicated inlets in the nacelle cover. In accordance with an embodiment of the invention, instead of providing dedicated internal ducting for cooling air as is conventional, the nacelle is arranged so that a portion of the nacelle cover 20 itself provides part of the cooling air conduit-defining structure. As shown in FIG. 1 an air conduit is defined between a bottom cover 22 of the nacelle 20 and an internal panel 24 which vertically overlies and extends parallel to the bottom cover 22, in essence forming a double-walled structure. As shown, this internal panel 24 extends over nearly all or at least the majority of the bottom cover 22 from an inlet 26 at the front region of the nacelle forward of the tower opening 19 as is shown in FIG. 2, passing around the opening 19 on both sides, extending towards the rear of the nacelle, such that the internal panel 24 underlies the majority if not all of the main operative components needing air cooling. The internal panel 24 also extends laterally across almost the entire width of the bottom cover 22, as can be seen in FIGS. 4 and 5A. The bottom cover 22 and internal panel 24 thereby define together a conduit for supply of cooling air to operative components. The air inlet 26 extends across a significant width of the bottom cover 24 in order to maximise the opening area and reduce the pressure drop as air is drawn in, and is covered by a grill or mesh to limit or prevent the ingress of rain, particles, insects or other foreign material or debris. An additional inlet region 28 may be provided to the rear of the yaw opening.

Figure 8:
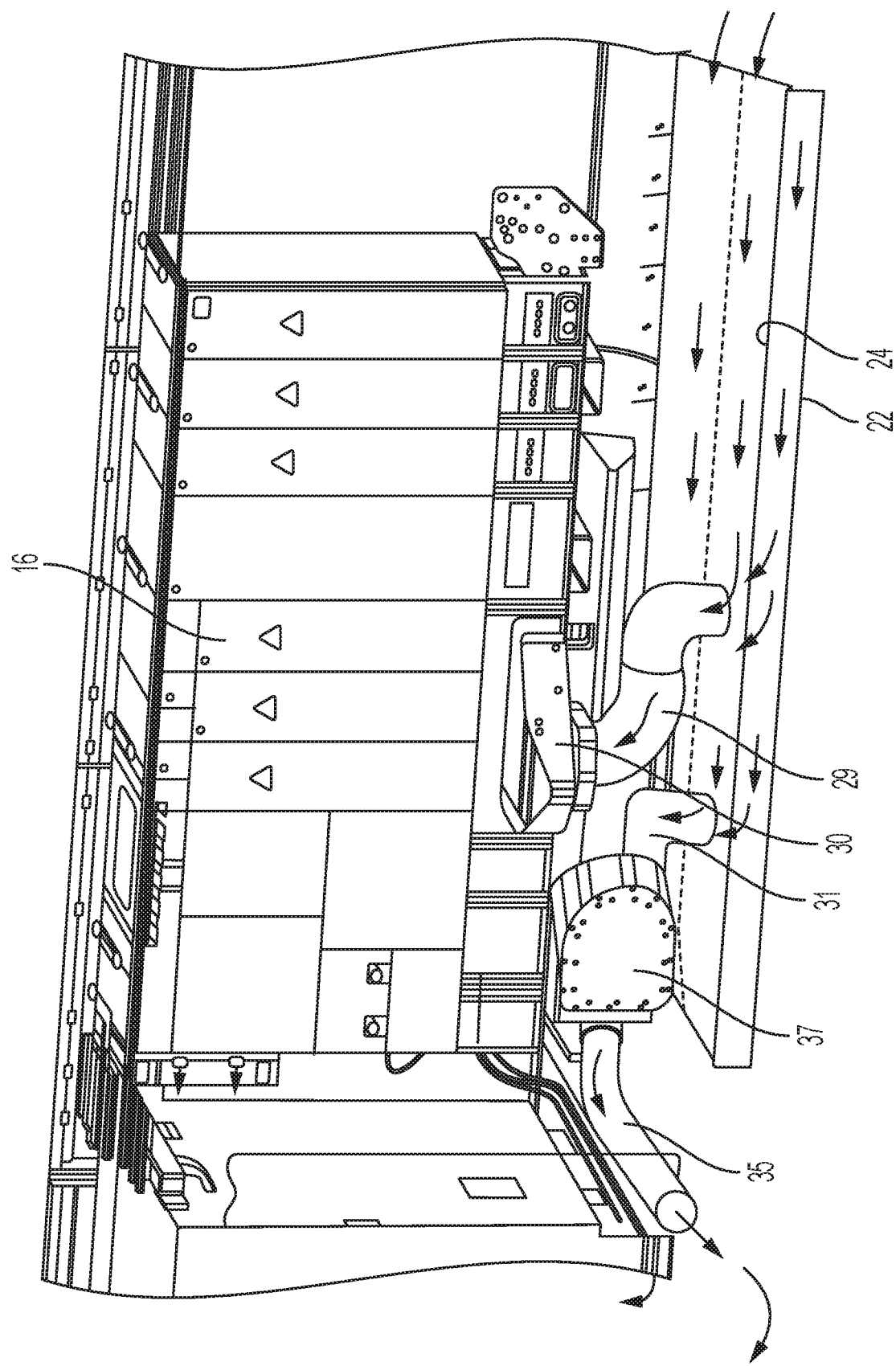
FIG. 8 is a cutaway view taken longitudinally along the nacelle along its mid-section to show air supply to converter cabinets.

The conduit supplies cooling air to one or more operative components. As shown in FIG. 8, air is supplied to converter 16, the internal panel 24 opening directly or indirectly via a short additional region of ducting 29 into the cooling air supply manifold of the converter 16. Fans are provided in order to draw air into and along the conduit, at the inlet 26 and/or at positions along the length of the conduit and/or at the points at which air is drawn off the conduit. As can be seen in FIG. 8 a fan 30 is located at the converter 16 between the ducting 29 and converter 16. Although not shown, air may exit the converter and nacelle via a dedicated outlet through a wall of the nacelle. Alternatively, it may be returned into the air conduit to mix with the fresh air or led into the transformer enclosure from where exits the nacelle.

To the rear of the air take off for the converter 16, the conduit further directs air to the transformer 18, opening directly into, or indirectly as illustrated via a short additional duct 35 into the transformer enclosure driven by fan 37. An air outlet 33 is provided at the nacelle rear, preferably at an upper region of the rear panel through which the heated air exits the transformer enclosure and nacelle and is exhausted to the external environment.

As an alternative, the internal panel may be of lesser lateral and/or longitudinal extent extending over a smaller region of the bottom cover.

A particular benefit of arranging the air conduit in the very lowermost region of the nacelle is that this region represents dead space which is otherwise largely unoccupied by other components. Moreover, the inlet can be arranged at a region towards the front of the nacelle which is relatively uncrowded, being led in a space-occupying manner which is highly efficient below the crowded rear of the nacelle, from where it can supply cooling air to several heat-generating components as discussed above. The structure is further beneficial in supporting a modularization of the nacelle in that the conduit structure can be provided to serve multiple nacelle layouts simply by making connection to the conduit at requisite locations according to component distribution and cooling need of a particular nacelle layout.

The internal panel 24 is preferably formed of a light rigid material in similar manner to the nacelle cover 20 for example of a moulded plastics or glass-fibre reinforced plastics. In view of the significant extent of the panel it is preferably formed of multiple sub-panel sections connected together. The panel 24 is preferably supported on the bottom cover 22 by any suitable fixings, screws, bolts or adhesive or the like. Alternatively, it might be separately supported directly or indirectly by the machine frame. The underside of the internal panel 24 may be formed with depending walls or partitions to further contain the airflow for example to direct airflow to specific points at which connection to operative components is made. Sealing structures such as rubber seals or gaskets may be provided to ensure an air tight joint between bottom cover 22 and internal panel 24.

Figure 6:
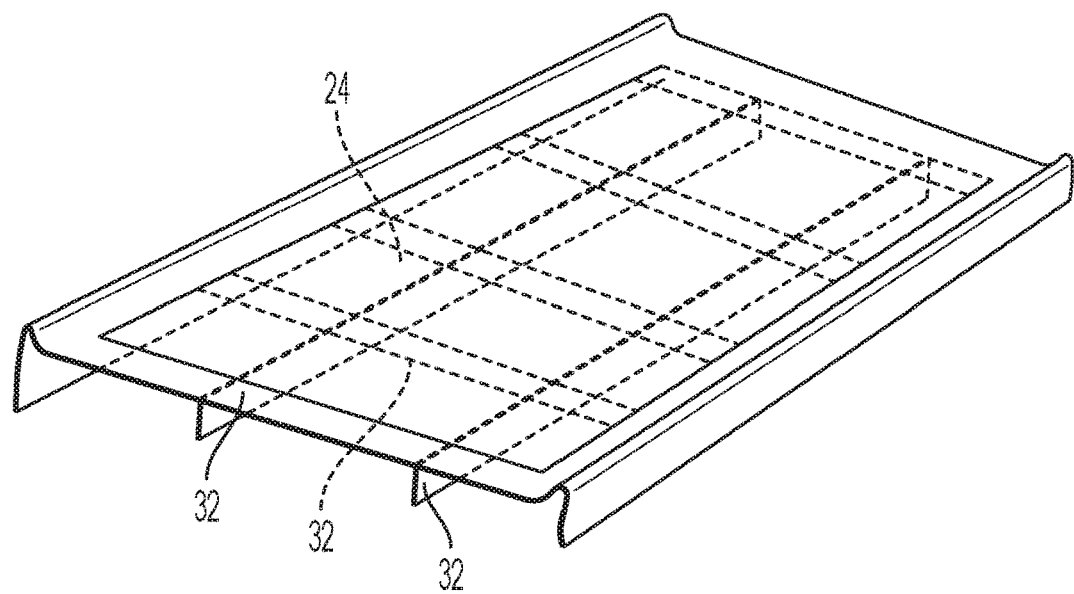
FIG. 6 shows a part of the panel provided in a modular form.

In one form the internal panel 24 may have a construction by which it can be used with a variety of different nacelle configurations. As shown in FIG. 6 the internal panel 24 is then provided on manufacture with a series of longitudinal and lateral partitions 32 crossing the underside of the internal cover, which prior to assembly can be selectively removed to define a flow path or paths in order to fit with the specific layout of operative components within the nacelle. In this way a single internal panel design can be manufactured and then adapted through removal of certain partitions to fit with the needed layout. To this end the partitions 32 may be moulded with frangible joint regions to allow easy selective removal. This further supports modularization of the nacelle.

As an alternative to arranging the circuit between a part of the nacelle cover and a separate panel, the nacelle cover itself may be formed with a double wall configuration, either as separate spaced panels joined together or even as a unitary moulding. In this case the outermost of the panels is formed with the air inlet and the inner is formed with connections to the respective heat generating components.

Figure 5B:
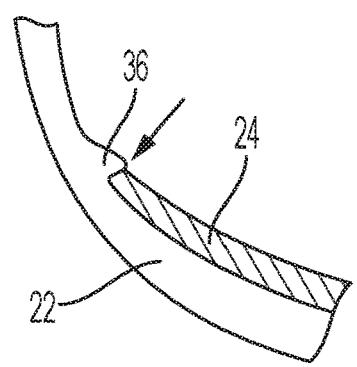
FIG. 5B is a detail of FIG. 5A.
Figure 7:
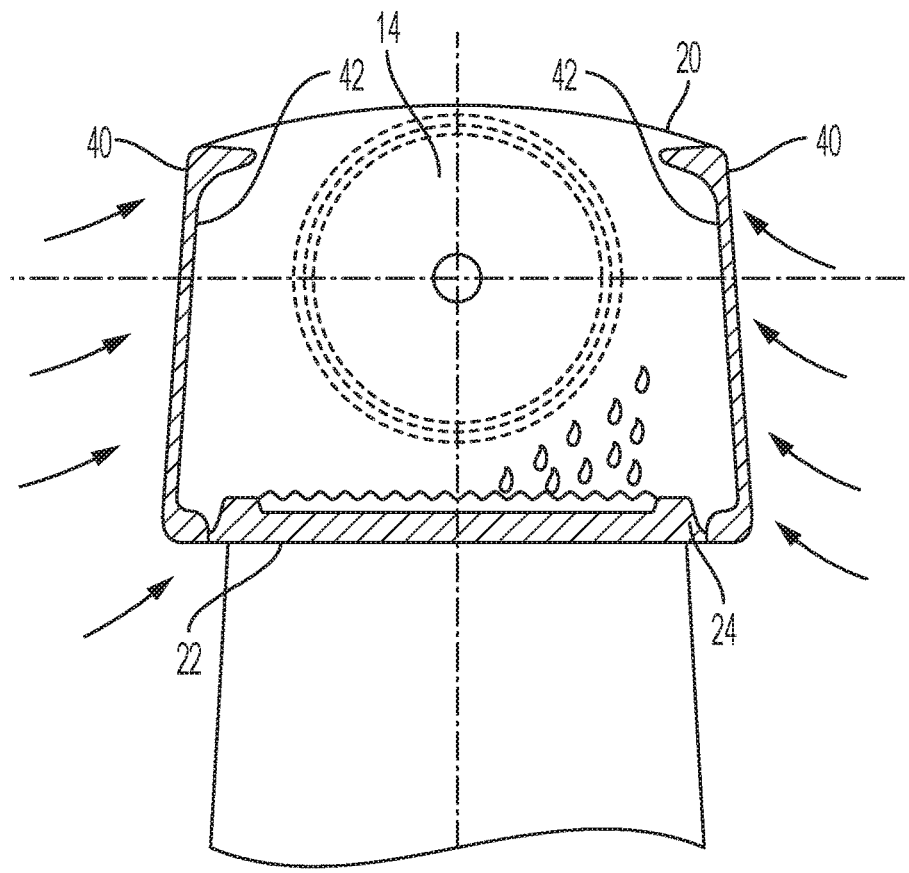
FIG. 7 is a schematic section across the nacelle showing an embodiment further provided with cooling side panels.

In one embodiment, as shown in FIGS. 5A, B and FIG. 6 the internal panel 24 is further provided with functionality as a liquid spillage tray. The internal panel 24 is shaped to define upwardly a shallow liquid-containing receptacle, having an upwardly extending rim 34 so that liquid which might inadvertently leak from an operative component, such as lubricating or cooling oil or water or other cooling medium, may be constrained in order to be collected and removed during a service operation, and prevented from leaking outside the nacelle. FIG. 7 shows schematically use of the internal panel 24 as a spillage tray collecting liquid leaked from gearbox or generator 14. As shown in FIG. 5B, at the interface between the bottom cover 22 and internal panel 24 the bottom cover 22 may be formed with an internally protruding lip 36. This serves to form a seal between bottom cover 22 and internal panel 24 so that any liquid which might drip down the interior of the nacelle cover for example down the walls is directed into the tray. Further, at its edge the internal cover 24 may define outside the rim 34 a shallow channel 38 in the manner of a gutter to constrain and direct such liquid. This feature is particularly useful to collect condensation which flows down the inside of the walls, allowing it to be directed to a collection vessel or to a drain hole.

The above described embodiment utilises the space between nacelle bottom cover 20 and internal panel 24 as a cooling air conduit. As an alternative configuration (or even in addition) conduits may be defined between a side wall or walls of the nacelle cover and an internal side panel or panels which laterally overlie and extend parallel to the side wall or side walls. This configuration may be combined with the first embodiment described above; as shown in FIG. 7 the side wall 40 is provided with an internal side panel 42 defining therebetween a rearwardly extending conduit. At a forward end of the conduit there is provided an inlet region likewise covered in a grill or mesh to prevent ingress of unwanted material, the conduit extending along the length of the sidewall or side walls towards the rear of the nacelle. One or more internal ducts are connected to the conduit to direct cooling air into operative components such as the transformer and converter.

In a still further adaptation the conduit construction may be used to provide a degree of air cooling of components such as gearbox and generator which are liquid cooled; for example, the oil or water cooling circuits may employ heat exchangers which are then air cooled with air from the conduit. Whilst the air conduit may not supply all the cooling need for such components, it may contribute to such cooling.

It will be appreciated that various modifications to the embodiments described above are possible and will occur to those skilled in the art without departing from the scope of the invention which is defined by the following claims.

The invention claimed is:

1. A wind turbine comprising a nacelle which houses operative components which in use generate heat, the nacelle including an external nacelle cover to form an enclosure, and provided with an internal panel which overlies a region of the external nacelle cover to define therewith a conduit for directing external cooling air to one or more of the heat generating operative components, wherein a duct or ducts are connected between the internal panel and one or more heat generating operative components to direct the cooling air thereto from the conduit.

2. The wind turbine according to claim 1, wherein the internal panel overlies a bottom cover of the external nacelle cover.

3. The wind turbine according to claim 2, wherein the internal panel extends laterally across substantially the entire width of the bottom cover.

4. The wind turbine according to claim 1, wherein the external nacelle cover includes an air inlet which opens into the conduit.

5. The wind turbine according to claim 4, wherein the air inlet is provided at a region forward of a tower opening.

6. The wind turbine according to claim 5, wherein the internal panel extends from the region forward of the tower opening, around sides of the tower opening towards the rear of the nacelle.

7. The wind turbine according to claim 1, wherein the duct or ducts connect to air inlet manifolds of the heat generating operative components.

8. The wind turbine according to claim 1, wherein the heat generating operative components comprise one or more of a converter and a transformer.

9. The wind turbine according to claim 1, wherein the internal panel includes an underside facing the external nacelle cover, the underside having partitions configured to direct the flow of cooling air.

10. The wind turbine according to claim 9, wherein the partitions extend laterally and longitudinally, and wherein the partitions are configured to be selectively removable prior to assembly in order to define a desired flow path for a particular configuration of heat generating operative components.

11. The wind turbine according to claim 1, wherein one or more fans are provided in the conduit or at connections between the conduit and the one or more heat generating operative components to draw air into the conduit and force the air to the one or more heat generating operative components.

12. The wind turbine according to claim 1, wherein the internal panel is formed with an upstanding rim to upwardly define a liquid collecting receptacle to collect any liquid leakage or spillage from liquid containing operative components.

13. The wind turbine according to claim 12, wherein a number of receptacles may be defined by upstanding rims, the receptacles associated with individual components.

14. The wind turbine according to claim 12, wherein the internal panel defines a channel region at its lateral periphery to collect any liquid passing down side walls of the external nacelle cover.

15. The wind turbine according to claim 1, wherein the internal panel is arranged to laterally overlie a side wall of the external nacelle cover.

16. A method of cooling heat generating operative components in the wind turbine according to claim 1, the method comprising drawing air into the conduit from an exterior and directing air via the conduit and ducts to the heat generating operative components.

17. The method according to claim 16, further comprising directing air into the conduit at a forward region of the nacelle.

18. The method according to claim 16, further comprising expelling air from the nacelle after passage over the heat generating operative components.

19. A wind turbine, comprising:
a nacelle; and
one or more operative components housed within the nacelle, the one or more operative components configured to generate heat in use and configured to be cooled by air directed thereon via an air inlet manifold,
wherein the nacelle includes an external nacelle cover to form an enclosure and an internal panel which overlies a region of the external nacelle cover to define therewith a conduit configured to pass cooling air therethrough, and
wherein the external nacelle cover includes an air inlet opening in communication with the conduit, the internal panel having one or more openings coupled to respective air ducts configured to direct the cooling air from the conduit onto the one or more operative components.

* * * * *